US010229094B2

United States Patent
Rumsey et al.

(10) Patent No.: US 10,229,094 B2
(45) Date of Patent: *Mar. 12, 2019

(54) DYNAMIC SIMULATION OF A RESPONSIVE WEB PAGE

(71) Applicant: Adobe Inc., San Jose, CA (US)

(72) Inventors: Anthony Rumsey, Kanata (CA); Gabriel Walt, Binningen (CH)

(73) Assignee: Adobe Inc., San Jose, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 15/064,092

(22) Filed: Mar. 8, 2016

(65) Prior Publication Data

US 2016/0188550 A1    Jun. 30, 2016

Related U.S. Application Data

(63) Continuation of application No. 14/024,899, filed on Sep. 12, 2013, now Pat. No. 9,311,422.

(51) Int. Cl.
| | | |
|---|---|---|
| *G06F 17/00* | (2006.01) | |
| *G06F 17/22* | (2006.01) | |
| *G06F 17/24* | (2006.01) | |
| *G06F 17/30* | (2006.01) | |
| *G06F 3/0482* | (2013.01) | |
| *G06F 17/21* | (2006.01) | |
| *G06F 17/27* | (2006.01) | |

(52) U.S. Cl.
CPC ........ *G06F 17/2247* (2013.01); *G06F 3/0482* (2013.01); *G06F 17/212* (2013.01); *G06F 17/248* (2013.01); *G06F 17/2785* (2013.01); *G06F 17/3089* (2013.01); *G06F 17/30905* (2013.01)

(58) Field of Classification Search
CPC ........................... G06F 17/248; G06F 17/3089
See application file for complete search history.

(56) References Cited

U.S. PATENT DOCUMENTS

| | | | | |
|---|---|---|---|---|
| 5,363,482 | A | 11/1994 | Victor et al. | |
| 6,023,714 | A * | 2/2000 | Hill | G06F 17/211 |
| | | | | 715/235 |
| 6,589,291 | B1 * | 7/2003 | Boag | G06F 17/2247 |
| | | | | 707/E17.121 |
| 7,194,683 | B2 * | 3/2007 | Hind | G06F 17/30896 |
| | | | | 707/E17.118 |
| 7,426,734 | B2 | 9/2008 | Debique et al. | |

(Continued)

*Primary Examiner* — Laurie A Ries
(74) *Attorney, Agent, or Firm* — Finch & Maloney PLLC

(57) ABSTRACT

Techniques are disclosed for dynamically simulating a structured document. A visual layout of a presentation of a structured document is determined in accordance with a style property associated with and specific to a first type of media device. The laid out structured document including the style property specific to the first type of media device is sent to a web browser executing on a second type of media device for rendering on the second type of media device. The first type of media device has a different display requirement than the second type of media device. The style property may be encoded in a set of presentation semantics. A media-dependent style rule encoded in the set of presentation semantics may be used to determine that the display requirement of the first type of media device satisfies the media-dependent style rule.

17 Claims, 7 Drawing Sheets

(56) References Cited

U.S. PATENT DOCUMENTS

| | | |
|---|---|---|
| 7,937,408 B2 | 5/2011 | Stuhec |
| 8,176,416 B1 * | 5/2012 | Williams ............ G06F 17/2247 |
| | | 715/243 |
| 8,554,800 B2 | 10/2013 | Goldentouch |
| 8,667,387 B2 | 3/2014 | Sahota |
| 8,812,951 B1 | 8/2014 | White |
| 9,063,726 B1 | 6/2015 | Stepanov et al. |
| 9,898,446 B2 * | 2/2018 | Weber ................. G06F 17/2247 |
| 2001/0056460 A1 | 12/2001 | Sahota et al. |
| 2002/0035579 A1 | 3/2002 | Wang et al. |
| 2003/0037076 A1 | 2/2003 | Bravery et al. |
| 2003/0229900 A1 | 12/2003 | Reisman |
| 2004/0049574 A1 | 3/2004 | Watson et al. |
| 2004/0205621 A1 | 10/2004 | Johnson et al. |
| 2005/0060277 A1 | 3/2005 | Zlatanov et al. |
| 2006/0224607 A1 * | 10/2006 | Tchaitchian ........ G06F 17/2247 |
| 2006/0265641 A1 | 11/2006 | Garfinkle et al. |
| 2007/0067305 A1 | 3/2007 | Ives |
| 2008/0120538 A1 | 5/2008 | Kurz et al. |
| 2008/0301545 A1 | 12/2008 | Zhang et al. |
| 2010/0030752 A1 | 2/2010 | Goldentouch |
| 2010/0194753 A1 | 8/2010 | Robotham et al. |
| 2010/0199197 A1 * | 8/2010 | Faletski ............ G06F 17/30905 |
| | | 715/760 |
| 2010/0251098 A1 | 9/2010 | Rekhi et al. |
| 2011/0154225 A1 | 6/2011 | Martin |
| 2011/0177775 A1 * | 7/2011 | Gupta .................... H04H 20/93 |
| | | 455/3.06 |
| 2011/0265003 A1 | 10/2011 | Schubert et al. |
| 2012/0066601 A1 | 3/2012 | Zazula et al. |
| 2012/0239598 A1 | 9/2012 | Cascaval et al. |
| 2013/0097488 A1 | 4/2013 | Coman et al. |
| 2013/0151951 A1 * | 6/2013 | Hall ...................... G06F 17/227 |
| | | 715/235 |
| 2013/0204450 A1 * | 8/2013 | Kagan ..................... H04L 67/06 |
| | | 700/291 |
| 2013/0272613 A1 | 10/2013 | Bodin et al. |
| 2014/0055495 A1 | 2/2014 | Kim et al. |
| 2014/0067543 A1 | 3/2014 | Yu et al. |
| 2014/0096025 A1 * | 4/2014 | Mandel ................... H04L 67/34 |
| | | 715/739 |
| 2014/0149397 A1 | 5/2014 | Gil et al. |
| 2015/0046832 A1 | 2/2015 | George et al. |
| 2015/0074518 A1 | 3/2015 | Rumsey et al. |

* cited by examiner

DYNAMIC SIMULATION OF A RESPONSIVE WEB PAGE

CROSS-REFERENCE TO RELATED APPLICATION

This application is a continuation of U.S. patent application Ser. No. 14/024,899, filed Sep. 12, 2013, the entire disclosure of which is hereby incorporated by reference herein.

FIELD OF THE DISCLOSURE

This disclosure relates generally to the field of rendering web page content, and more particularly, to techniques for dynamically simulating the appearance of a web page on a media device.

BACKGROUND

In the field of rendering web page content, structured data that defines the content of a web page can be syntactically and logically separated from a set of presentation semantics that define the visual appearance and layout of the web page. Such a separation has the advantage that one version of the content can be optimized for presentation on various different types of media devices by using different presentation semantics. Some of the presentation semantics describe how the content should be laid out for a particular type of media device. For example, using different presentation semantics, the same content can be laid out in a large format for a personal computer (PC) with a relatively large display, a small format for a smartphone with a relatively small display, and a medium format for an automobile infotainment system or a tablet computer. Some techniques exist for automatically determining the appropriate layout of the web page based on the type of media device on which the web page is being rendered or on the size of the viewport or display window within the web browser of the media device.

DETAILED DESCRIPTION

Figure 1:
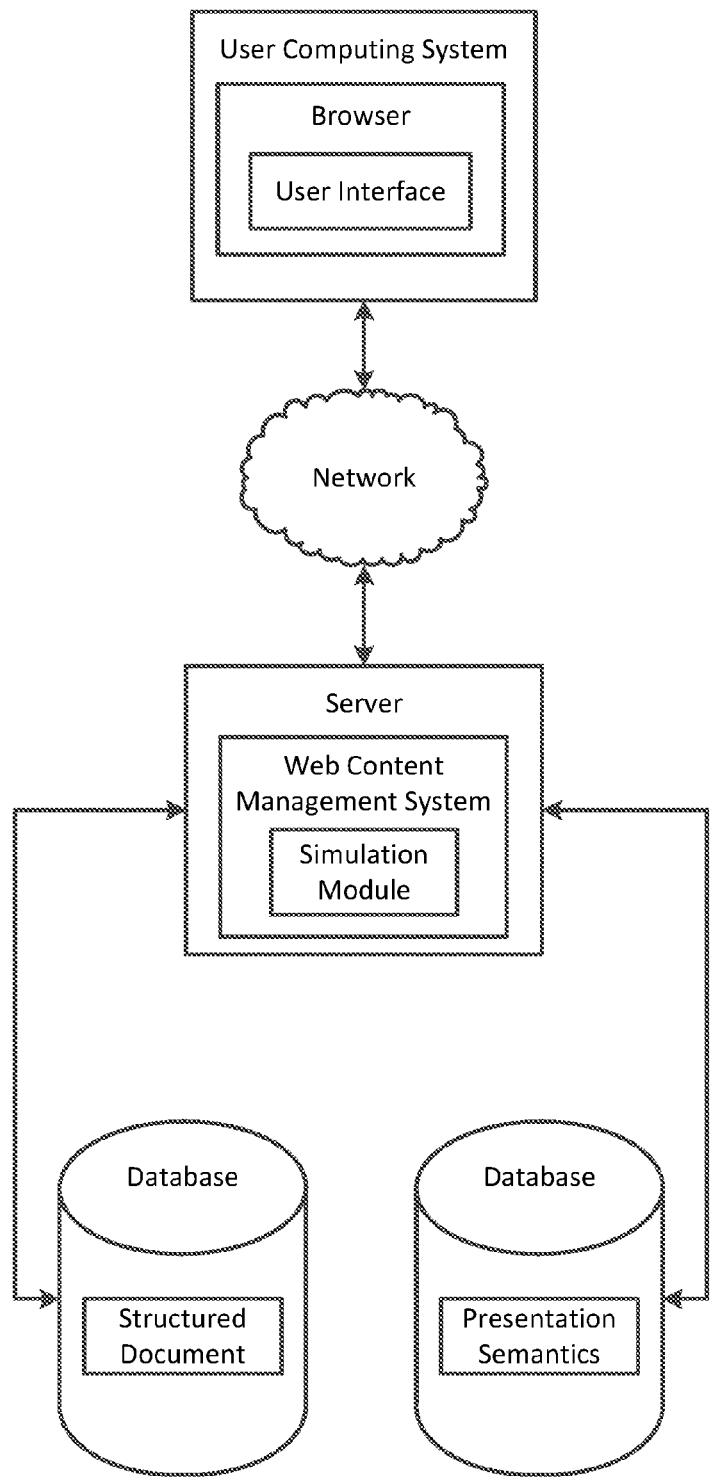
FIG. 1 illustrates a web page authoring system configured in accordance with an embodiment of the present invention.

Techniques are disclosed for dynamically simulating a structured document as it would appear on various different types of media devices through the use of media-dependent style rules encoded in a set of presentation semantics. In one embodiment, a user request is received, through a user interface, to render a structured document (e.g., a web page) in a web browser. The web browser can execute on a first type of media device, such as a PC. The user request includes a request to render the structured document in a layout specific to a second type of media device, such as a mobile device, having a different display requirement than the first type of media device. The second type of media device can be selected from several predefined types of media devices. Associated with the structured document is a set of presentation semantics that define the visual layout of the document. One or more media-dependent style rules encoded in the set of presentation semantics are identified. If a requirement of the second type of media device, such as screen width, resolution or page orientation, satisfies the media-dependent style rule(s), a visual layout of a browser presentation of the structured document is determined in accordance with one or more style properties associated with the satisfied rule(s). The structured document may be rendered, presented or otherwise simulated on the web browser of the first type of media device according to the visual layout for the second type of media device. Numerous configurations and variations will be apparent in light of this disclosure.

General Overview

The phrase responsive web design generally refers to the practice of designing web pages that are suitable for viewing on media devices with different screen sizes. For instance, while a multi-column web page layout with large images may work well for a large display of a PC-type browser, the same layout may not fit into the smaller display of a smartphone or tablet computer without truncating or scaling down the text and/or images. Even if it is possible to fit the same layout onto differently sized displays (smaller or larger) by merely truncating or scaling, the resulting appearance may be undesirable, if not illegible or unusable. Thus, the web page may be designed to utilize several layouts suitable for different screen sizes. For example, the web page may be designed to use a single-column layout with small images on a mobile device with a small screen instead of the multi-column layout used on larger displays. In some cases, a responsive web page can detect the size of the screen and automatically render the web page using a layout that is suitable for the device. However, when designing a web page with some authoring tools, it can be difficult to visualize its appearance on various different types of devices. To see how a web page will appear on another device, the user may manually resize the web browser window (also referred to herein as a viewport) to approximate the screen size of the device. By resizing the window, the browser may layout the web page to accommodate the new size. Alternatively, the user may port the web page to another device for viewing. However, these techniques require the user to either know the screen sizes of other devices, or have access to other types of hardware. Furthermore, these techniques are not integrated into the authoring tool.

Thus, and in accordance with an embodiment of the present invention, techniques are provided herein for simulating the appearance of a web page on different types of media devices using a web content management system (WCMS) or other such web page authoring tool. In one specific example embodiment, user interface controls can be added to an existing user interface element, such as a sidekick widget or control panel of the WCMS that is present in the authoring environment. When activated, the user interface controls enable the user to select a type of media device from a list of predefined devices (e.g., "Apple iPhone® 4," "Apple iPhone® 5," "Apple iPad®," "Samsung Galaxy S®4," user-defined devices, etc.) and rendering options, such as page orientation (e.g., portrait or landscape). When the user enters a preview mode of the WCMS, the web page will initially be displayed in a web browser without any additional processing; that is, the web page will be displayed in a normal layout for the browser, which may be, for example, a PC-type browser. Once the media device type is selected, a copy of every style sheet associated with the web page is examined for any media-dependent rules. If requirements of the selected media device type, such as screen width, resolution or orientation, satisfy the media-dependent rule(s), any style properties associated with those rule(s) are applied to the web page. Additional markup, if any, is applied, and the laid out web page is displayed in a simulated graphical user interface (GUI) of the mobile device. The simulated GUI may be rendered, for example, within a viewport of the WCMS browser. The web browser viewport can be adjusted based on the selected media device type. For example, the body of laid out web page may be adjusted to match the width of the media device being simulated. This may mean that the simulated presentation of the web page will be narrower than the actual width of the web browser viewport. In some cases, the current device type selection can be remembered when switching between web pages in the simulated GUI. Selecting a different type of device or rendering option cancels the applied style properties. The device selection and all applied style properties can also be canceled when exiting the preview mode.

As used herein, the term "media device," in addition to its plain and ordinary meaning, includes, but is not limited to, any hardware and/or software that displays or otherwise presents text, graphics or other visual content in a digital form. Some non-limiting examples of types of media devices include a desktop computer, a laptop computer, a tablet computer, a handheld computer and a mobile phone, each having at least one display device or rendering surface capable of displaying text, graphics, images, etc. A given media device may have an associated display requirement. As used herein, the term "display requirement," in addition to its plain and ordinary meaning, includes, but is not limited to, a screen size (e.g., the maximum height and/or width of a rendering surface of the media device, a resolution (e.g., the maximum number of pixels the media device is capable of displaying), a brightness (e.g., the maximum brightness in lumens), a contrast (e.g., the maximum difference in luminance between pixels), and/or a display orientation of the media device (e.g., portrait or landscape orientation). As used herein, the term "web content management system" ("WCMS"), in addition to its plain and ordinary meaning, includes, but is not limited to, any hardware and/or software that provide tools for creating, editing and managing website content. One specific example of a WCMS is Adobe CQ5. As used herein, the term "presentation semantics," in addition to its plain and ordinary meaning, includes, but is not limited to, instructions or syntax that specify the visual appearance and layout of a web page. For example, presentation semantics may specify certain visual style properties of the web page, such as the type, size, or color of a font, the width of a column of text, and/or the position of an image in the web page. Some markup languages, such as HTML and CSS, use presentation semantics for rendering web content. As used herein, the term "markup language," in addition to its plain and ordinary meaning, includes, but is not limited to, any language that supports annotating content, or structured data, using a syntax that is separate from the syntax of the structured data itself. The annotations (markups) do not have to relate to the presentation semantics or style rules associated with the structured data. However, in some mark-up languages, for example, HyperText Markup Language (HTML), the annotations may relate to presentation semantics, which may be advantageously used in various techniques described herein. In addition, the structured data and the presentation semantics may be included in a single file or may be in separate files. For example, the presentation semantics may be included in a Cascading Style Sheets (CSS) file, and the structured data may be included in an HTML file. As used herein, the term "style rule," in addition to its plain and ordinary meaning, includes, but is not limited to, a rule or set of rules that can be used to determine whether a subset of presentation semantics are to be used when a particular set of conditions are satisfied. For instance, a style rule may be used to designate and differentiate various style properties and values within the presentation semantics for the display requirements of a given media device.

As mentioned above, structured data that defines the content of a web page can be syntactically and logically separated from a set of presentation semantics that define the visual appearance and layout of the web page. The presentation semantics may describe, for example, so-called style properties for aspects such as font, font size, colors, multimedia, etc. The presentation semantics can be encoded in a so-called style sheet, such as a Cascading Style Sheet (CSS). In contrast to the presentation semantics, a markup language is a language that supports annotating content, or structured data, using a syntax that is distinct from the syntax of the structured data itself In some markup languages, such as HyperText Markup Language (HTML), Extensible Markup Language (XML), and Extensible HyperText Markup Language (XHTML), the annotations (i.e., markups) may be associated with the presentation semantics. Such an association between the presentation semantics and the structured data may be advantageously used in the techniques variously described herein. In some cases, the structured data and the presentation semantics can be included in separate documents or files, or they may be combined at least in part in the same document or file.

One feature of a style sheet, in particular a CSS, is that it can be used to specify how the structured data is to be presented, or laid out, on different types of media, such as a desktop PC display screen, a mobile device screen, a printer, a speech synthesizer, a braille device, and so forth. Some style properties in the style sheet may be applied only to specific types of media; that is, such style properties are media-dependent. For instance, a style property defining page breaks within the web page may only apply to printed media, while a style property defining the location of a streaming video player within the web page may only apply to display media. Some other style properties may be applied to multiple types of media, such as a property designating the font size for both display and print media. However, some types of media may be different enough that different values may be used for the same style property. For example, the font size may be larger on a computer screen than on a printed page. Accordingly, at least some style properties can be designated, and/or have different values, for certain types of media. A media-dependent style rule is one technique for designating and differentiating style properties and values within the presentation semantics for different types of media.

In some responsive web designs, various layouts for different media types are encoded in one or more sets of presentation semantics associated with the structured document (e.g., a web page). As discussed above, media-dependent style rules can be included in the presentation semantics to designate a layout for a particular type of media device. The style rules are based on one or more requirements of the media device, such as the maximum screen width, resolution, or orientation, on which the structured document is to be rendered. For example, if a web browser is executing on a mobile device with a small screen, any style properties associated with style rules satisfied by a small screen size will be applied for determining a visual layout of a browser presentation of a web page in a small screen format. On the other hand, if the web browser is executing on a desktop device with a large screen, the small screen style rules will not be satisfied and the associated properties will not be applied to the web page. Since these style properties can affect the appearance of a web page on a particular type of media device, it may be advantageous to simulate the appearance of the web page on one type of device, such as a mobile device, while using another type of device, such as a PC, for designing the web page.

In accordance with one embodiment, a user interface in a web page authoring tool can be used to select the type of media device the user wishes to simulate. Style properties associated with media-dependent rules that are satisfied by certain requirements of the selected type of media device, such as screen size, resolution and page orientation, are applied to the document as regular styles. In this manner, the layout of the web page on the selected type of media device can be simulated. The simulated layout is displayed in the browser of the authoring tool, enabling the user to view the layout of the web page as it would appear on the selected device.

System Architecture

FIG. 1 illustrates a web page authoring system configured in accordance with an embodiment of the present invention. A user computing system includes a browser application (e.g., Microsoft Internet Explorer®, Mozilla Firefox®, Safari®, Google Chrome®, or Opera®) or other application that can be used to request and receive content from a server via a communications network (e.g., the Internet or an intranet). The server includes a web content management system (WCMS), such as Adobe CQ5 sold by Adobe Systems, Inc. of San Jose, Calif., and a simulation module, which may be configured as a plug-in or add-on software module to extend the functionality of the WCMS in accordance with various embodiments. Although depicted in FIG. 1 as separate devices, it will be appreciated than in some embodiments the user computing system and the server may be integrated; for example, the WCMS may be implemented locally on the user computing system. One or more databases operatively connected to the server and the WCMS can be configured to store one or more repositories of structured documents (e.g., web page content), presentation semantics (e.g., style sheets) and/or other data created and maintained by the WCMS.

Such a system may be suitable, for example, for accessing the repositories and providing website authoring and administration tools that enable a user to create, modify, manage and simulate, among other things, website content, including web pages. In combination, the structured documents and the presentation semantics can be used for any number of purposes (e.g., e-commerce, news, social networking, blogs, cloud-based tools and applications, to name a few). To this end, the techniques variously disclosed herein can be used to simulate the visual appearance of the structured documents according to different layouts described by the presentation semantics, some of which may be specific to certain types of media devices.

The network can be any communications network, such as a user's local area network and/or the Internet, or any other public and/or private communication network (e.g., local and/or wide area network of a company, etc). The user's computing system (client) can be implemented with any suitable computing device, such as a laptop, desktop, tablet computer, smartphone, or other suitable computing device capable of accessing a server via a network and displaying content to a user. The browser application can be implemented using any number of known or proprietary browsers or comparable technology that facilitates retrieving, presenting, and traversing information resources on a network, such as the Internet.

As will be appreciated in light of this disclosure, the various modules and components of the system shown in FIG. 1, such as the simulation module, can be implemented in software, such as a set of instructions (e.g. C, C++, object-oriented C, JavaScript, Java, BASIC, etc) encoded on any computer readable medium or computer program product (e.g., hard drive, server, disc, or other suitable non-transient memory or set of memories), that when executed by one or more processors, cause the various methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

Example Layouts of a Structured Document

Figure 2A:
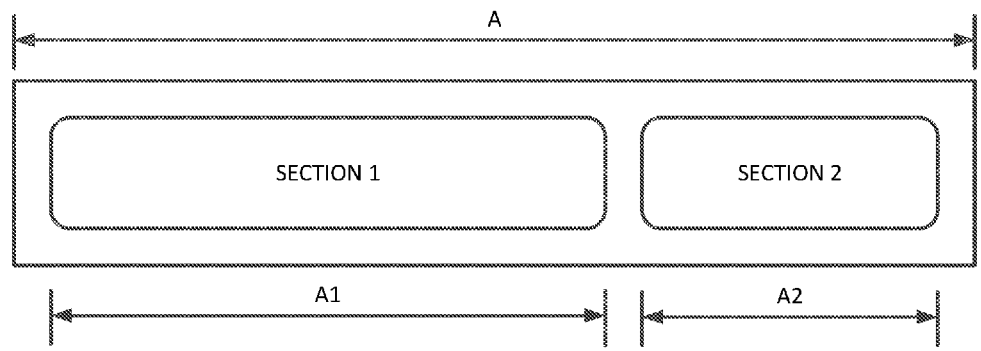
FIGS. 2a-d illustrate several example layouts of a structured document, in accordance with an embodiment of the present invention.

By way of overview, FIGS. 2a-d illustrate several example layouts of a structured document, such as stored in the databases of FIG. 1, in accordance with an embodiment. Each of these figures depicts a web page having content laid out in two sections, indicated as Section 1 and Section 2. As noted above, different types of media devices, such as PCs and mobile devices, can have differently sized screens. For example, in portrait orientation a PC display monitor is often wider than it is tall, while a smartphone display is often taller than it is wide. Thus, as depicted in FIG. 2a, when the web page is displayed on a wide screen, Section 1 and Section 2 may be laid out side-by-side (i.e., a multi-column style). In this example layout, the overall width of the viewport is A, and the widths of Sections 1 and 2 are A1 and A2, respectively. Widths A1 and A2, when added together, are no greater than width A. The widths of Sections 1 and 2 may be determined, for example, by the presentation semantics associated with the structured document, or may be hard-coded into the structured document itself.

Figure 2B:
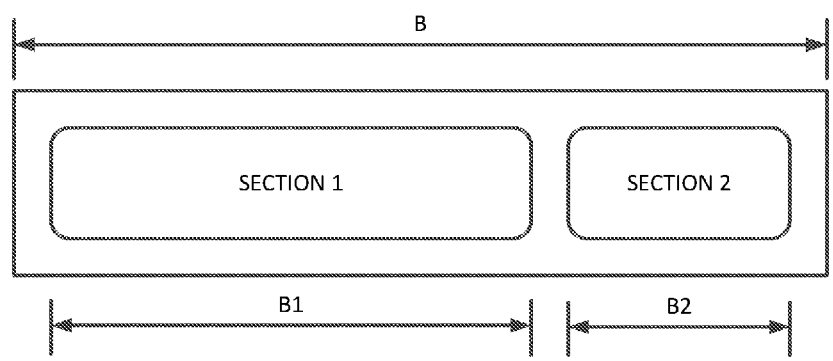

FIG. 2b depicts another example of the structured document of FIG. 2a, except the overall width of the viewport, indicated at B, is less than A. In this example layout, Sections 1 and 2 are depicted in a multi-column style where the widths of Sections 1 and 2, indicated at B1 and B2, respectively, are each narrower than A1 and A2. As above, the widths of Sections 1 and 2 may be determined by the presentation semantics, which provide a different layout than shown in FIG. 2a based on the narrower viewport in FIG. 2b. Such a layout may be appropriate for a tablet computer that has a narrower screen than a PC display monitor but wider than a smartphone. In an embodiment, the layout can be determined using one or more style rules included in the presentation semantics. Each style rule defines a set of conditions that, when satisfied, cause a subset of the presentation semantics to be applied to the layout. For example, if a given media device (e.g., an iPhone 5) has a display requirement of 640 pixels maximum width, then a style rule that defines a maximum width of 640 pixels will be satisfied for the display requirements of the given media device, and a subset of the presentation semantics associated with the satisfied rule can be applied to the layout. Any presentation semantics associated with styles rules that are not satisfied by the display requirements are generally not applied to the layout. However, presentation semantics that are not associated with any style rules are generally applied to the layout. As mentioned above, some markup languages, such as HTML, support presentation semantics encoded in a style sheet, such as CSS, or in an HTML document.

Figure 2C:
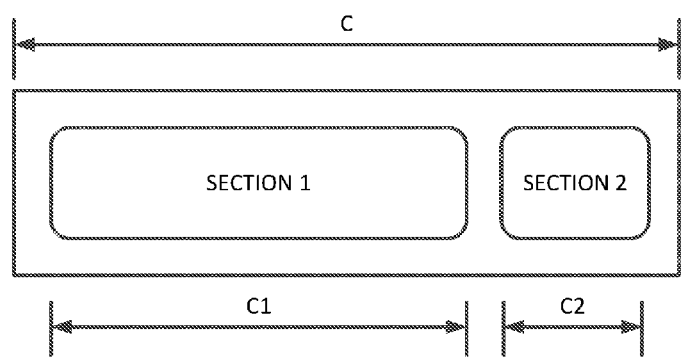

FIG. 2c depicts yet another example of the structured document of FIGS. 2a and 2b, except the overall width of the viewport, indicated at C, is less than both A and B. In this example layout, Sections 1 and 2 are again depicted in a multi-column style where the widths of Sections 1 and 2, indicated at C1 and C2, respectively, are each narrower than B1 and B2. As above, the widths of Sections 1 and 2 may be determined by the presentation semantics, which provide a different layout than shown in FIGS. 2a and 2b based on the narrower viewport of FIG. 2c. Such a layout may be appropriate for a smartphone that has a narrower screen than a tablet computer.

As will be appreciated in view of the above-described example layouts, as the width of the viewport changes (i.e., wider or narrower), the layout of the elements in the structured document (e.g., Sections 1 and 2) can also change to accommodate the various viewport widths. However, depending on the nature of the content of Sections 1 and 2, there may be certain viewport widths at which the layout becomes undesirable. For instance, due to the different viewport widths, Section 2 is significantly narrower in FIG. 2c than in FIG. 2a, which may make viewing the content in Section 2 difficult or impossible (e.g., if the font or images in the section become too small to read or the text or images become truncated). Therefore, as an alternative to the example layout of FIG. 2c, a different layout that is more satisfactory for the design may be implemented, such as shown in FIG. 2d.

Figure 2D:
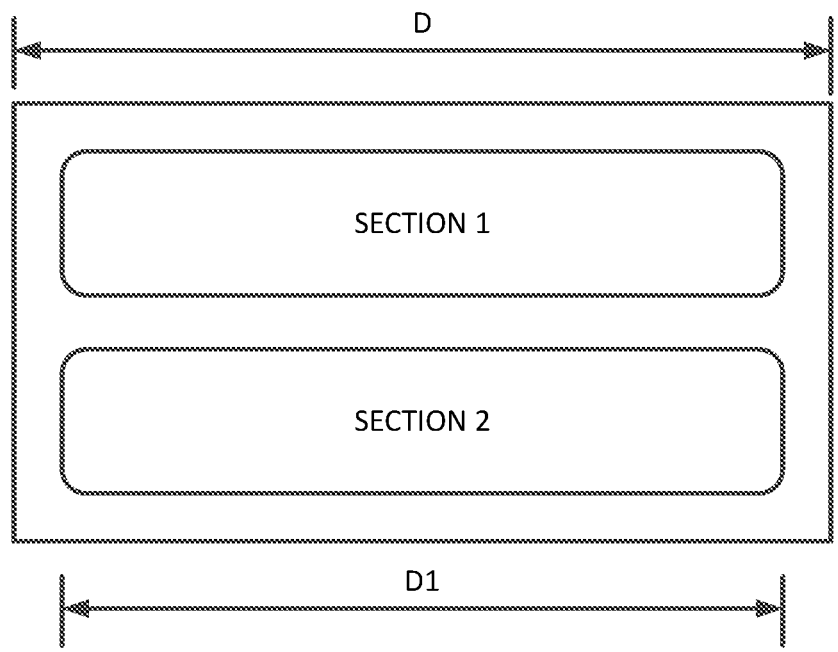

FIG. 2d depicts another example of the structured document of FIG. 2c, where the overall width of the viewport, indicated at D, is substantially the same as C (e.g., to accommodate the relatively narrow screen of a smartphone). However, by contrast to FIG. 2c, in the example layout of FIG. 2d Sections 1 and 2 are depicted in a single-column style where the widths of each section, indicated at D1, are the same but also wider than C1 and C2. As above, the widths of Sections 1 and 2 may be determined by the presentation semantics, which provide a different layout than shown in FIGS. 2a and 2b based on the narrower viewport of FIG. 2d. This example layout may be more satisfactory than the one depicted in FIG. 2c since each section is wider, and therefore possibly more legible, etc., but still within the overall width of the same viewport. It will be appreciated that the example layouts described herein are merely presented for explanatory purposes, and that any number of layouts and sections or other elements of the structured document will be readily apparent. For example, in addition to, or instead of, using different layouts for a structured document rendered on different types of devices, certain elements (e.g., Section 1 or Section 2) of the document may be selectively shown or hidden, the typesetting may be modified, or other aspects of the document and/or presentation semantics may be altered to achieve a desired result. Notably, in accordance with various embodiments, multiple layouts or other configurations can be created for the same structured document so that it appears differently on different types of media devices.

Figure 3:
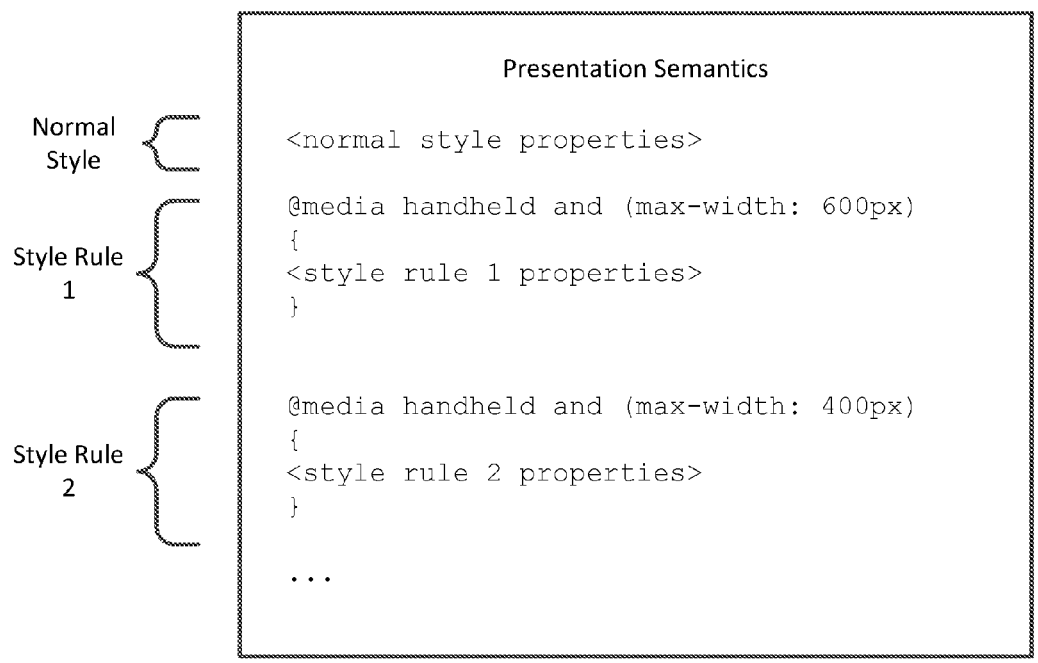
FIG. 3 illustrates an example set of presentation semantics, in accordance with an embodiment of the present invention.

FIG. 3 depicts an example of a set of presentation semantics, in accordance with an embodiment. In this example, the presentation semantics may be stored in a style sheet that is associated with a structured document (not shown). The style sheet is shown in a pre-processed state, such as may be stored in the database of FIG. 1. A pre-processed state includes a state in which less than all of the presentation semantics in the style sheet have been processed by, for example, the WCMS, the simulation module and/or the web browser of FIG. 1. In some embodiments, the style sheet can be processed before the structured document is rendered by a web browser, and/or the web browser can process the presentation semantics as the structured document is being rendered. The presentation semantics may be encoded using, for example, the CSS language. The example presentation semantics of FIG. 3 include three sets of style properties (e.g., font size, margins, position within the viewport, column width, etc.): a normal style and two other styles (i.e., style rule 1 and style rule 2) that are each dependent on separate media-dependent style rules (defined as @media or @import rules in the CSS context).

In this example, first assume that the type of media device on which the structured document is being displayed has the following requirements (or characteristics): it is a handheld device, such as a smartphone or tablet computer with a maximum screen width of 600 pixels. Other combinations of media device requirements will be apparent in other cases and for other applications. The normal style properties can be applied to the structured document because there is no media-dependent rule associated with these properties. Further, the style rule 1 properties can also be applied to the structured document because the media-dependent style rule associated with the style 1 rule properties is satisfied by the requirements of the device (i.e., style rule 1 is defined for a handheld-type media device and a maximum screen width of 600 pixels). However, the style rule 2 properties will not be applied because the associated media-dependent style rule (i.e., style rule 2: handheld, maximum screen width=400 pixels) is not satisfied by the requirements of the device, since the maximum screen width of the media device is greater than 400 pixels.

By contrast, assume now that the type of media device on which the structured document is being displayed has the following requirements (or characteristics): it is a desktop PC (in CSS, this may be referred to as a "screen"-type device). This may be the case, for example, if the WCMS is being used on a PC-type computer to create and edit the structured document. According to the example presentation semantics, the normal style properties can be applied to the structured document without regard to the type of media device rendering the structured document because there is no media-dependent rule associated with these properties. However, neither the style rule 1 properties nor the style 2 properties will be applied because the associated media-dependent style rules are not satisfied by the requirements of the device; namely, each rule is defined for a "handheld"-type device, such as a smartphone or tablet computer, but not a "screen"-type device, such as the desktop PC. Because of this, the user will not be able to view the layout of the structured document on the desktop PC as it would be rendered on a "handheld"-type device.

Figure 4:
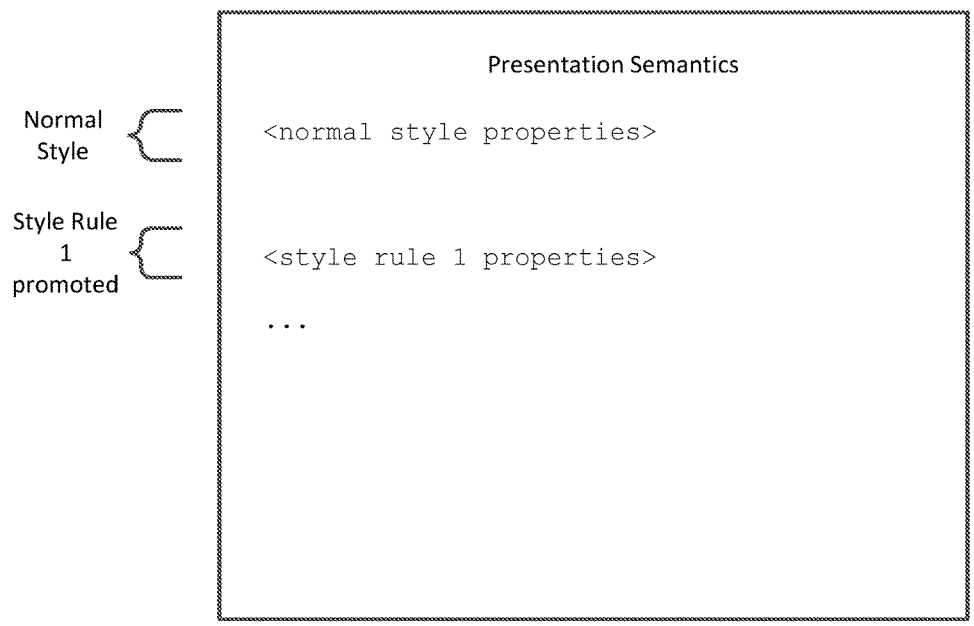
FIG. 4 illustrates another example set of presentation semantics, in accordance with an embodiment of the present invention.

FIG. 4 depicts another example set of presentation semantics, in accordance with an embodiment. The style sheet is the same style sheet in the example of FIG. 3 except shown in a processed state. A processed state includes a state in which at least some of the presentation semantics in the style sheet have been processed by, for example, the WCMS, the simulation module and/or the web browser of FIG. 1. In this example, again assume that the type of media device on which the structured document is being displayed has the following requirements (or characteristics): it is a desktop ("screen"-type) device. However, as will be described in further detail below, the style sheet has been processed by, for example, the simulation module of FIG. 1, to modify the style sheet so that the structured document will be rendered in a layout that is specific to a handheld device with a maximum screen width of 600 pixels. Such processing can be performed in response to receiving a user request to render, or simulate, the structured document in a layout specific to the handheld device on a web browser executing on a desktop PC. As described above, the normal style properties can be applied to the structured document because there is no media-dependent rule associated with these properties. As a result of the user request, any media-dependent style rules satisfied by the requirements of the selected media device type are deleted, and associated style rule properties are promoted into the main body of the presentation semantics. Thus, as shown in the example of FIG. 4, the style 1 rule properties can also be applied to the structured document because the media-dependent style rule (style rule 1), which is satisfied by the specified media device type (handheld, maximum screen width=600 pixels), has been removed from the style sheet, leaving the style 1 rule properties disassociated with any media-dependent style rules. In other words, the style rule 1 properties have been promoted out of the media-dependent style rule as a result of the processing of the style sheet. Note that the style rule 2 properties will not be applied because the associated media-dependent style rule (i.e., style rule 2: handheld, maximum screen width=400 pixels) is not satisfied by the requirements of the device, since the maximum screen width of the media device is greater than 400 pixels. In some embodiments, such unsatisfied rules and their associated style properties may be ignored or deleted during the processing of the style sheet.

Methodology

Figure 5:
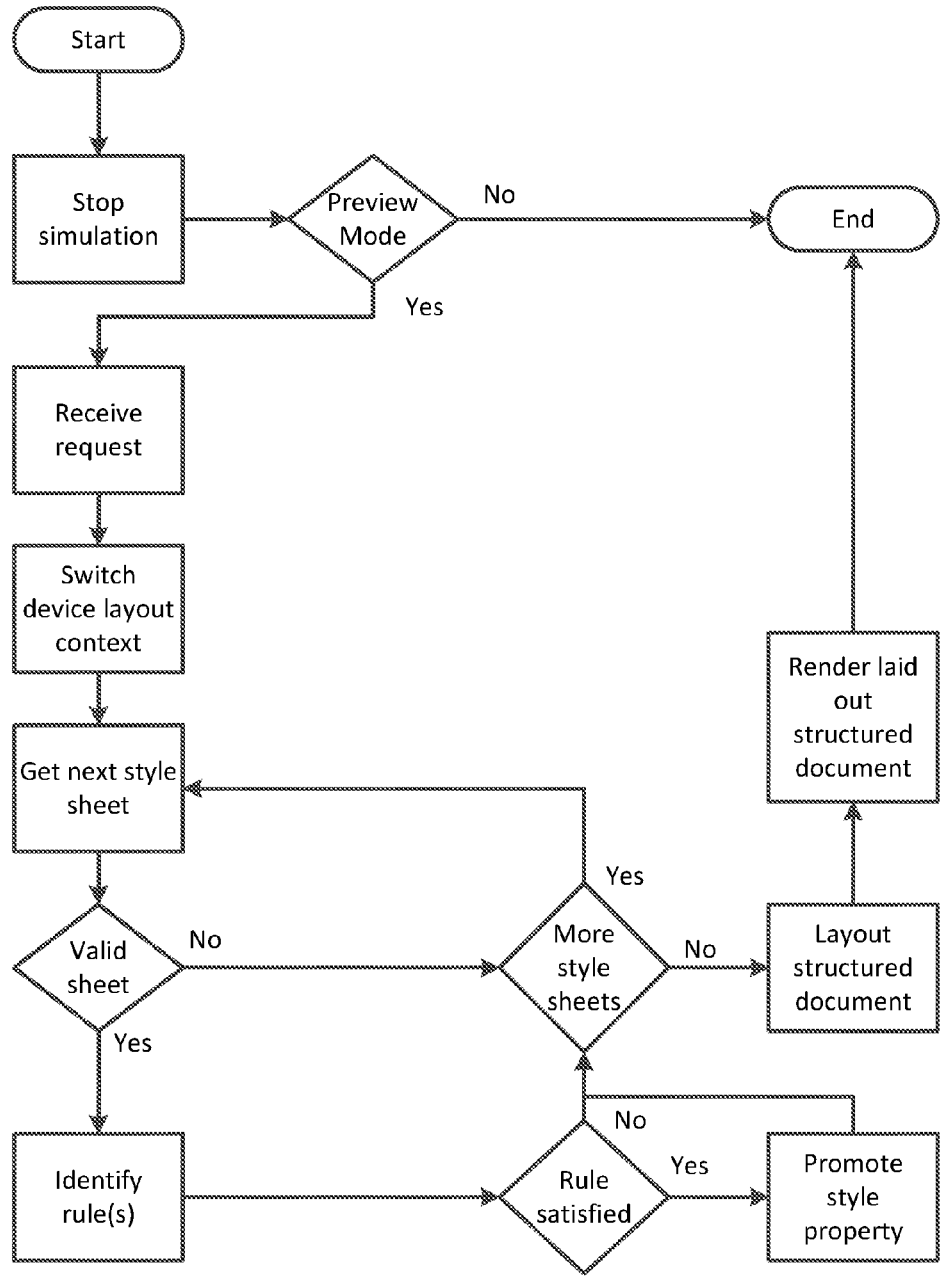
FIG. 5 illustrates an example methodology for dynamically simulating a structured document, in accordance with an embodiment of the present invention.

FIG. 5 illustrates an example methodology for dynamically simulating a structured document, such as a responsive HTML web page, according to an embodiment. This and other methods can be carried out, for example, via the WCMS, the simulation module, the browser and/or the user interface of FIG. 1, or other code embedded or otherwise executable within one or more components of the system of FIG. 1.

Figure 6:
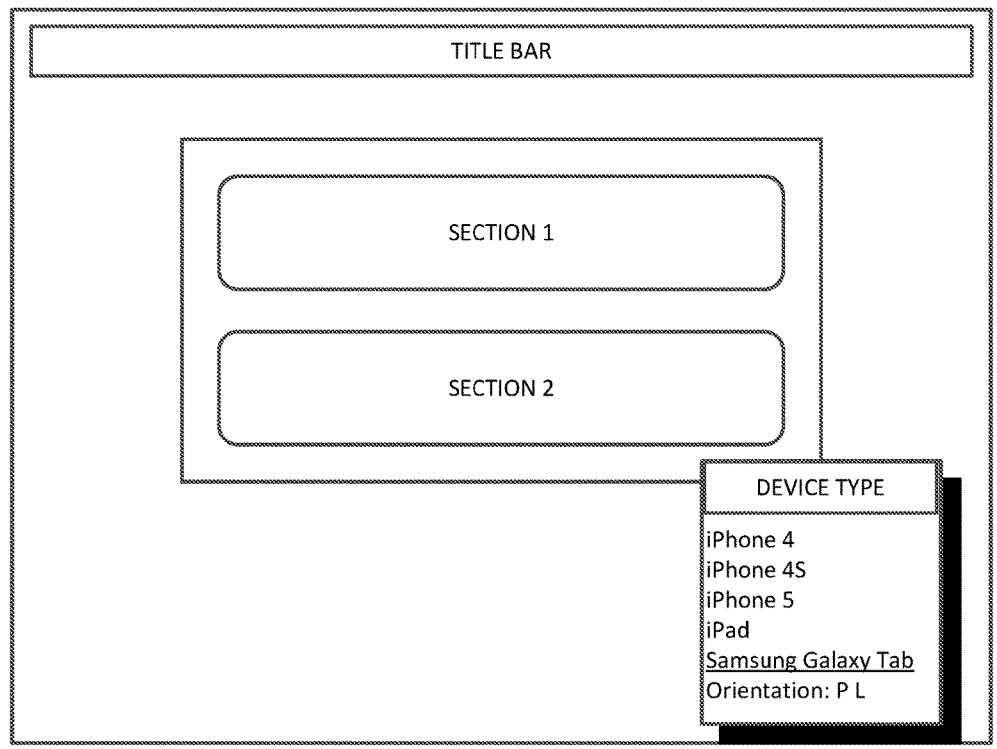
FIG. 6 illustrates an example user interface of a web authoring system for simulating the appearance of a web page on different types of media devices, in accordance with an embodiment.

The method begins when a user starts or launches a user interface (such as the user interface of FIG. 1) in conjunction with the WCMS. The user interface, an example of which is shown and described below with respect to FIG. 6, is configured to provide the user with a list of predefined types of media devices, such as described above, from which a type of media device may be selected for simulation. Any simulations of media device types currently executing are stopped when the user interface is launched. If the user subsequently selects to enter a preview mode for viewing the simulation, the method continues; otherwise, the method ends.

The method continues by receiving a user request to render a structured document in a web browser executing on a first type of media device in a layout specific to a second type of media device having a different screen size or other display requirement than the first type of media device. The first type of media device may include, for example, a desktop PC, and the second type of media device may include, for example, a smartphone or tablet computer. In some cases, the second type of media device may include a specific device model and/or operating system of the device (e.g., iPhone 5), although it will be understood that the second type of media device may be designated in other ways, such as by classification (e.g., 2.3 inch-wide handheld devices, etc.). In some other cases, the user request may specify whether the structured document should be rendered in a particular viewing orientation, such as portrait or landscape.

The method continues by switching the layout context of the structured document from the first type of media device to the second (i.e., selected) type of media device. The layout context designates the format in which the structured document is to be presented, such as a desktop PC layout, a smartphone layout or a tablet computer layout. The method continues by retrieving a set of presentation semantics associated with the structured document, such as may be included in one or more style sheets. If the style sheet is valid, that is, if the style sheet is properly associated with the structured document, the method continues by identifying one or more media-dependent style rules in the set of presentation semantics. If the style sheet is not valid, and if there are any more style sheets available, additional presentation semantics are retrieved from the next style sheet.

For each identified rule in the presentation semantics, a determination is made whether the media-dependent style rule is satisfied by the display requirement of the second type of media device, such as described above with respect to FIGS. 3 and 4. The display requirements may include, for example, a maximum screen width and/or a viewing orientation (e.g., portrait or landscape). If the display requirement satisfies the media-dependent style rule, the style property associated with the satisfied rule is promoted out of the rule within the set of presentation semantics, and the rule is deleted. The process of identifying the media-dependent style rules, determining whether the rules are satisfied by the display requirements of the selected media device type, and promoting style properties associated with the satisfied rules may repeat indefinitely until all presentation semantics associated with the structured document have been so processed.

The method continues by determining a visual layout of a browser presentation of the structured document in accordance with the one or more style properties associated with the satisfied media-dependent style rule(s) (i.e., the rule(s) determined to be satisfied by the requirements of the selected media device type). The method continues by rendering the laid out structured document in the web browser; that is, presenting the structured document in the web browser according to the determined visual layout. The web browser viewport can be adjusted based on the selected media device type. For example, the body of laid out structured document may be adjusted to match the width of the media device being simulated. This may mean that the simulated presentation of the document will be narrower than the actual width of the web browser viewport. The adjustment of the document width to be different from the browser viewport width, in conjunction with the associated style properties, provides a more complete simulation of how a document may appear on a variety of devices from directly within the browser.

Example User Interface

FIG. 6 illustrates an example user interface for providing a list of media device types that can be used in accordance with an embodiment. The web page may include any type of content, such as text, graphics, audio, video and the like, such as would be displayed in a web page. A window and title bar, such as found in a conventional web browser, is shown for reference. Within the window is a viewport for displaying the rendered web page, which in this example includes Section 1 and Section 2 laid out in a single column format. Other layouts will be apparent in light of this disclosure. Also displayed is a user interface, indicated with the title "DEVICE TYPE." The user interface includes a user-selectable list of media devices types. As discussed above, in some embodiments, a user may select one of the media device types listed in the user interface to request that the web browser simulate the appearance of the web page in a layout specific the selected media device type. Other user interface techniques for presenting and selecting media device types may be implemented. In some cases, the user interface may include an orientation selector (e.g., "P" for portrait orientation and "L" for landscape orientation) for selecting the orientation of the simulated web page in the viewport.

Numerous embodiments will be apparent, and features described herein can be combined in any number of configurations. An example embodiment of the present invention provides a computer-implemented method. The method includes receiving, via a user interface, a user request to render, in a web browser executing on a first type of media device, a structured document in a layout specific to a second type of media device having a different display requirement than the first type of media device, the second type of media device being selected from a plurality of predefined types of media devices. The method further includes determining a visual layout of a browser presentation of the structured document in accordance with a style property encoded in a set of presentation semantics associated with the second type of media device. In some cases, the method further includes identifying a media-dependent style rule encoded in the set of presentation semantics associated with the structured document, and determining that the display requirement of the second type of media device satisfies the media-dependent style rule, where the style property is associated with the satisfied media-dependent style rule. In some such cases, the method further includes retrieving the set of presentation semantics from a style sheet file associated with the structured document, where the style sheet file has the media-dependent style rule encoded therein. In some other such cases, the display requirement of the second type of media device includes a maximum width of a rendering surface of the second type of media device, a maximum display resolution of the second type of media device, and/or a display orientation of the second type of media device. In some other such cases, the method further includes repeating, for each of a plurality of media-dependent style rules, the acts of identifying the media-dependent style rule, determining that the display requirement of the second type of media device satisfies the media-dependent style rule and determining the visual layout. In some cases, the method further includes sending the laid out structured document to the web browser for rendering on the first type of media device. In some such cases, the laid out structured document is rendered within a viewport that is larger than a display requirement of the second type of media device. In some cases, the method further includes providing, via the user interface, a list of the plurality of predefined types of media devices. In some cases, the structured document is encoded in HyperText Markup Language (HTML). In some cases, the set of presentation semantics is encoded in Cascading Style Sheet (CSS) language. Variations will be apparent.

Another example embodiment of the present invention provides a system having a storage and a processor operatively coupled to the storage. The processor is configured to carry out a process including receiving, via a user interface, a user request to render, in a web browser executing on a first type of media device, a structured document in a layout specific to a second type of media device having a different display requirement than the first type of media device, the second type of media device being selected from a plurality of predefined types of media devices. The process further includes determining a visual layout of a browser presentation of the structured document in accordance with a style property encoded in a set of presentation semantics associated with the second type of media device and stored in the storage. In some cases, the process further includes identifying a media-dependent style rule encoded in the set of presentation semantics associated with the structured document, and determining that the display requirement of the second type of media device satisfies the media-dependent style rule, where the style property is associated with the satisfied media-dependent style rule. In some such cases, the process further includes retrieving the set of presentation semantics from a style sheet file associated with the structured document, where the style sheet file has the media-dependent style rule encoded therein. In some other such cases, the display requirement of the second type of media device includes a maximum width of a rendering surface of the second type of media device, a maximum display resolution of the second type of media device, and/or a display orientation of the second type of media device. In some other such cases, the process further includes repeating, for each of a plurality of media-dependent style rules, the acts of identifying the media-dependent style rule, determining that the display requirement of the second type of media device satisfies the media-dependent style rule and determining the visual layout. In some cases, the process further includes sending the laid out structured document to the web browser for rendering on the first type of media device. In some such cases, the laid out structured document is rendered within a viewport that is larger than a screen size of the second type of media device. In some cases, the process further includes providing, via the user interface, a list of the plurality of predefined types of media devices. In some cases, the structured document is encoded in Hyper-Text Markup Language (HTML). In some cases, the set of presentation semantics is encoded in Cascading Style Sheet (CSS) language. Yet another embodiment provides a non-transient computer-readable medium or computer program product having instructions encoded thereon that when executed by one or more processors cause the processor(s) to perform one or more of the functions variously described in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method for simulating a structured document, the method comprising:
   determining a visual layout of a browser presentation of a structured document in accordance with a style property associated with and specific to a first type of media device, wherein the style property is encoded in a set of presentation semantics;
   identifying a media-dependent style rule encoded in the set of presentation semantics and associated with the style property, wherein the media-dependent style rule is separate from the style property;
   determining that the display requirement of the first type of media device satisfies the media-dependent style rule;
   sending, based on the determination, the laid out structured document including the style property specific to the first type of media device but excluding the media-dependent style rule to a web browser executing on a second type of media device for rendering the style property on the second type of media device, the first type of media device having a different display requirement than the second type of media device; and
   causing the web browser executing on the second type of media device to render the laid out structured document on a display device.

2. The method of claim 1, further comprising, in response to the determination, deleting the media-dependent style rule from the set of presentation semantics while preserving the associated style property in the set of presentation semantics.

3. The method of claim 1, further comprising retrieving the set of presentation semantics from a style sheet file associated with the structured document, wherein the style sheet file has the media-dependent style rule encoded therein.

4. The method of claim 1, wherein the display requirement of the first type of media device includes at least one of a maximum width of a rendering surface of the first type of media device, a maximum display resolution of the first type of media device, and a display orientation of the first type of media device.

5. The method of claim 1, further comprising repeating, for each of a plurality of media-dependent style rules, the acts of identifying the media-dependent style rule and determining that the display requirement of the first type of media device satisfies the media-dependent style rule, wherein the method further comprises sending, based on the determinations, the laid out structured document including each of the style properties specific to the first type of media device but excluding each of the media-dependent style rules to the web browser executing on the second type of media device for rendering the respective style properties on the second type of media device.

6. The method of claim 1, wherein the laid out structured document is rendered within a viewport that is larger than a display requirement of the first type of media device.

7. The method of claim 1, further comprising providing, via the user interface, a list of the plurality of predefined types of media devices.

8. The method of claim 1, wherein the structured document is encoded in HyperText Markup Language (HTML).

9. The method of claim 1, wherein the set of presentation semantics is encoded in Cascading Style Sheet (CSS) language.

10. A data processing system, comprising:
    a storage; and
    a processor operatively coupled to the storage and configured to:
       determine a visual layout of a browser presentation of a structured document in accordance with a style property associated with and specific to a first type of media device, wherein the style property is encoded in a set of presentation semantics;
       identify a media-dependent style rule encoded in the set of presentation semantics and associated with the style property, wherein the media-dependent style rule is separate from the style property;
       determine that the display requirement of the first type of media device satisfies the media-dependent style rule;
       send, based on the determination, the laid out structured document including the style property specific to the first type of media device but excluding the media-dependent style rule to a web browser executing on a second type of media device for rendering the style property on the second type of media device, the first type of media device having a different display requirement than the second type of media device; and
       cause the web browser executing on the second type of media device to render the laid out structured document on a display device.

11. The system of claim 10, wherein the processor is further configured to, in response to the determination, delete the media-dependent style rule from the set of presentation semantics while preserving the associated style property in the set of presentation semantics.

12. The system of claim 10, wherein the processor is further configured to retrieve the set of presentation semantics from a style sheet file associated with the structured document, and wherein the style sheet file has the media-dependent style rule encoded therein.

13. The system of claim 10, wherein the display requirement of the first type of media device includes at least one of a maximum width of a rendering surface of the first type of media device, a maximum display resolution of the first type of media device, and a display orientation of the first type of media device.

14. The system of claim 10, wherein the processor is further configured to repeat, for each of a plurality of media-dependent style rules, the acts of identifying the media-dependent style rule and determining that the display requirement of the first type of media device satisfies the media-dependent style rule, wherein the method further comprises sending, based on the determinations, the laid out structured document including each of the style properties specific to the first type of media device but excluding each of the media-dependent style rules to the web browser executing on the second type of media device for rendering the respective style properties on the second type of media device.

15. The system of claim 10, wherein the laid out structured document is rendered within a viewport that is larger than the display requirement of the first type of media device.

16. The system of claim 10, wherein the processor is further configured to provide, via the user interface, a list of the plurality of predefined types of media devices.

17. A non-transitory computer program product encoded with instructions that when executed by one or more processors cause a process to be carried out, the process comprising:

determining a visual layout of a browser presentation of a structured document in accordance with a style property associated with and specific to a first type of media device, wherein the style property is encoded in a set of presentation semantics;

identifying a media-dependent style rule encoded in the set of presentation semantics and associated with the style property, wherein the media-dependent style rule is separate from the style property;

determining that the display requirement of the first type of media device satisfies the media-dependent style rule;

sending, based on the determination, the laid out structured document including the style property specific to the first type of media device but excluding the media-dependent style rule to a web browser executing on a second type of media device for rendering the style property on the second type of media device, the first type of media device having a different display requirement than the second type of media device; and causing the web browser executing on the second type of media device to render the laid out structured document on a display device.

\* \* \* \* \*